(12) United States Patent
Umeda

(10) Patent No.: US 6,252,193 B1
(45) Date of Patent: Jun. 26, 2001

(54) X TYPE ELECTRIC WELDING MACHINE

(75) Inventor: Shigeru Umeda, Ayase (JP)

(73) Assignee: Obara Corporation, Ayase (JP)

( * ) Notice: Subject to any disclaimer, the term of this patent is extended or adjusted under 35 U.S.C. 154(b) by 0 days.

(21) Appl. No.: 09/364,348

(22) Filed: Jul. 30, 1999

(51) Int. Cl.$^7$ .................................................. B23K 11/11
(52) U.S. Cl. .............................................................. 219/90
(58) Field of Search .................................. 219/90, 86.21, 219/86.23, 86.24, 86.25, 86.33, 86.41

(56) References Cited

U.S. PATENT DOCUMENTS 5,750,953 * 5/1998 Sato et al. ............................... 219/90
5,928,531 * 7/1999 Sato et al. .......................... 219/86.25

FOREIGN PATENT DOCUMENTS 4-294873 * 10/1992 (JP) .
7-236981 * 9/1995 (JP) .
9-57453 * 3/1997 (JP) .
9-248678 9/1997 (JP) .

* cited by examiner

*Primary Examiner*—Geoffrey S. Evans
(74) *Attorney, Agent, or Firm*—Flynn, Theil, Boutell & Tanis, P.C.

(57) ABSTRACT

An X type electric welding machine with an electrode pressing force that is not susceptible to the wear of electrodes or variation of deflection of gun arms which varies every pressing force. An accurate electrode pressing force can be obtained for an electrode pressing force set by a simple controller. The X type electric welding machine includes at least two gun arms each having electrodes at tip ends thereof which oppose each other. The gun arms are connected to each other at a connection part on which at least one gun arm is rotatably pivoted. A reduction gear is disposed separately from the connection part of the gun arms and a motor is connected to the reduction gear. A power transmission mechanism is provided at an output side of the reduction gear for rotating one of the gun arms, wherein the power transmission mechanism includes a swing arm fixed to an output shaft of the reduction gear and a link formed between the swing arm and one of the gun arms. The swing arm and the link are connected to each other so that an output from a shaft of the motor and an electrode pressing force applied by one of the electrodes that is transmitted to the one of the electrodes from a tip end of the swing arm by way of the link, have a substantially linear proportional relation.

8 Claims, 3 Drawing Sheets

X TYPE ELECTRIC WELDING MACHINE

BACKGROUND OF THE INVENTION

1. Field of the Invention

The invention relates to an X type electric welding machine comprising at least two gun arms each having electrodes at tip ends thereof which oppose each other wherein at least one gun arm is rotatably pivoted on a connection part (6) between the two gun arms, particularly to a rotating mechanism of the gun arms.

2. Description of Related Art

Conventionally, there has been an X type welding machine having first and second gun arms wherein the first gun arm is integrated with a gun bracket and the second gun arm is rotatably pivoted on the gun bracket so as to obtain a high electrode pressing force while restraining the capacity of the servomotor, and wherein the second gun arm presses against the first gun arm by a crank mechanism (pressing mechanism) composed of an output disc fixed to the output side of a reduction gear by way of a servomotor and the reduction gear, a pin provided at the outer periphery of the output disc, and a connector arm (link) provided so as to connect between the pin and the rear end of the second gun arm (see e.g., JP-A 9-248678).

However, in rotating means of the gun arms of the conventional X type electric welding machine, a pressing operation is performed at the position immediately before an angle formed between a line connecting between the center of the output disc by way of the reduction gear and the pin provided at the outer periphery of the output disc and a ring connecting between the rear end of the second gun arm and the pin becomes 180 degrees, thereby increasing the pressing force utilizing a so-called toggle mechanism.

Meanwhile, in such pressing means, the variation rate of the electrode pressing force relative to the variation of rotational angle of the output disc is large in view of the relation of the output of the link relative to rotational torque of the output disc, and further, the electrode pressing force is varied not linear functionally but exponential functionally as the angle set forth above approaches to 180 degrees so that the electrode pressing force is greatly varied by a slight variation of the angle formed between the pin and the link. In the practical use of a welding machine, the deflection of the gun arms is varied for every application force in addition to the variation of the wear of the electrode, and the wear of bearings for supporting pins including a main shaft so that it is difficult to obtain a stable angle. Accordingly, in view of a toggle mechanism where the pressing force is exponential functionally varied relative to the amount of variation of the rotational angle of the output disc, it is very difficult to control for obtaining an accurate electrode pressing force conforming to a set value of an electrode pressing force in the conventional X type electric welding machine.

SUMMARY OF THE INVENTION

The invention has been made in view of the problems of the conventional X type electric welding machine, and it is an object of the invention to provide an X type electric welding machine in which an electrode pressing force is not susceptible to the wear of electrodes or bearings, the variation of deflection of gun arms which varies for every electrode pressing force, an accurate electrode pressing force is outputted relative to an electrode pressing force which is set with an easy control mechanism or means, thereby obtaining a steady electrode pressing force.

To achieve the above object, an X type electric welding machine according to a first aspect of the invention comprises at least two gun arms each having electrodes at tip ends thereof which oppose each other, and gun arms being connected to each other at a connection part on which at least one gun arm is rotatably pivoted, a reduction gear being disposed separately from the connection part of the gun arms, and a motor being connected to the reduction gear, a power transmission mechanism provided at an output side of the reduction gear for rotating one of the gun arms, wherein said power transmission mechanism comprises a swing arm fixed to an output shaft of the reduction gear and a link formed between the swing arm and one of the gun arms, characterized in that the swing arm and the link are connected to each other in the manner that an output outputted from a shaft of the motor and an electrode pressing force applied to one of the electrodes which is transmitted to one of the electrodes from a tip end of the swing arm by way of the link have a substantially linear proportional relation.

An X type electric welding machine according to a second aspect of the invention comprises at least two gun arms each having electrodes at tip ends thereof which oppose each other, and gun arms being connected to each other at a connection part on which at least one gun arm is rotatably pivoted, a reduction gear being disposed separately from the connection part of the gun arms, and a motor being connected to the reduction gear, a power transmission mechanism provided at an output side of the reduction gear for rotating one of the gun arms, wherein said power transmission mechanism comprises a swing arm fixed to an output shaft of the reduction gear, a groove formed in the tip end of the swing arm and a roller provided on one of the gun arms and movable along the groove, characterized in that the roller provided on one of the gun arms is disposed to be movable in the groove provided in the tip end of the swing arm in the manner that an output outputted from a shaft of the motor and an electrode pressing force applied to one of the electrodes which is transmitted to one of the electrodes from a tip end of the swing arm by way of the roller have a substantially linear proportional relation.

An X type electric welding machine according to a third aspect of the invention comprises at least two gun arms each having electrodes at tip ends thereof which oppose each other, and gun arms being connected to each other at a connection part on which at least one gun arm is rotatably pivoted, a reduction gear being disposed separately from the connection part of the gun arms, and a motor being connected to the reduction gear, a power transmission mechanism provided at an output side of the reduction gear for rotating one of the gun arms, wherein said power transmission mechanism comprises a swing arm fixed to an output shaft of the reduction gear, a roller disposed in a groove formed in one of the gun arms and provided at the tip end of the swing arm, characterized in that the roller provided at the tip end of the swing arm is movable in the groove in the manner that an output outputted from a shaft of the motor and an electrode pressing force applied to one of the electrodes which is transmitted to one of the electrodes by way of the groove from the tip end of the swing arm have a substantially linear proportional relation.

An X type electric welding machine according to a fourth aspect of the invention comprises at least two gun arms each having electrodes at tip ends thereof which oppose each other, and gun arms being connected to each other at a connection part on which at least one gun arm is rotatably pivoted, a reduction gear being disposed separately from the connection part of the gun arms, and a motor being connected to the reduction gear, a power transmission mechanism provided at an output side of the reduction gear for rotating one of the gun arms, wherein said power transmission mechanism comprises a gear fixed to the output shaft of the reduction gear and a gear provided on one of the gun arms, characterized in that the gear fixed to the output shaft of the reduction gear and the gear provided on one of the gun arms mesh with each other in the manner that an output outputted from a shaft of the motor and an electrode pressing force applied to one of the electrodes which is transmitted to one of the electrodes from the gear fixed to the output shaft of the reduction gear by way of the gear provided on one of the gun arms.

PREFERRED EMBODIMENT OF THE INVENTION

First Embodiment (FIGS. 1 and 2):

An X type electric welding machine according to a first embodiment of the invention is now described with reference to FIG. 1 and 2.

Figure 1:
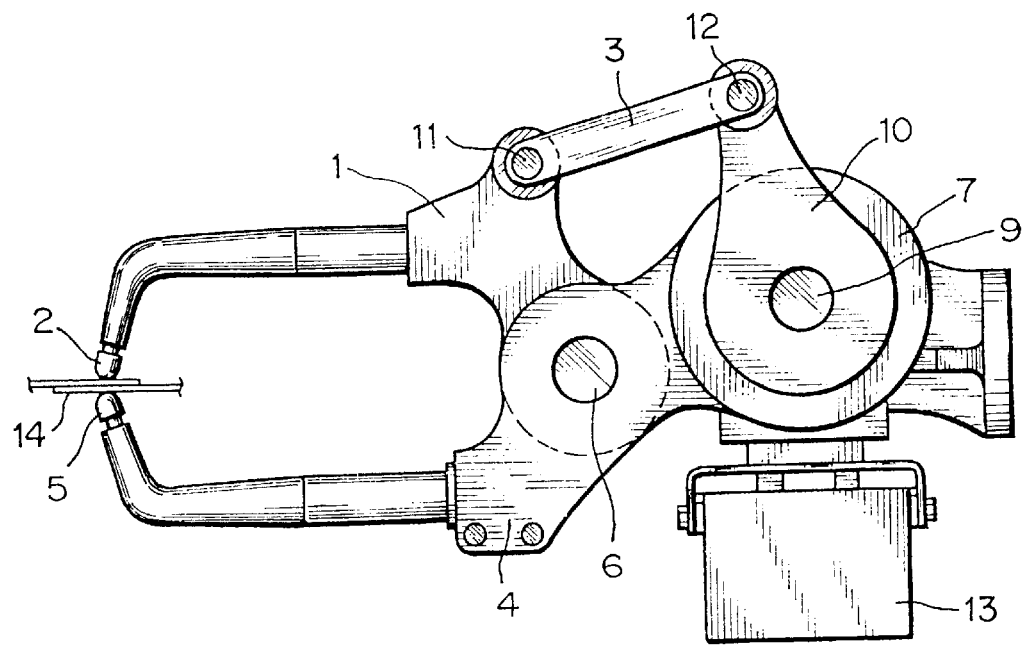
FIG. 1 is a side view of an X type electric welding machine according to a first embodiment of the invention.
Figure 2:
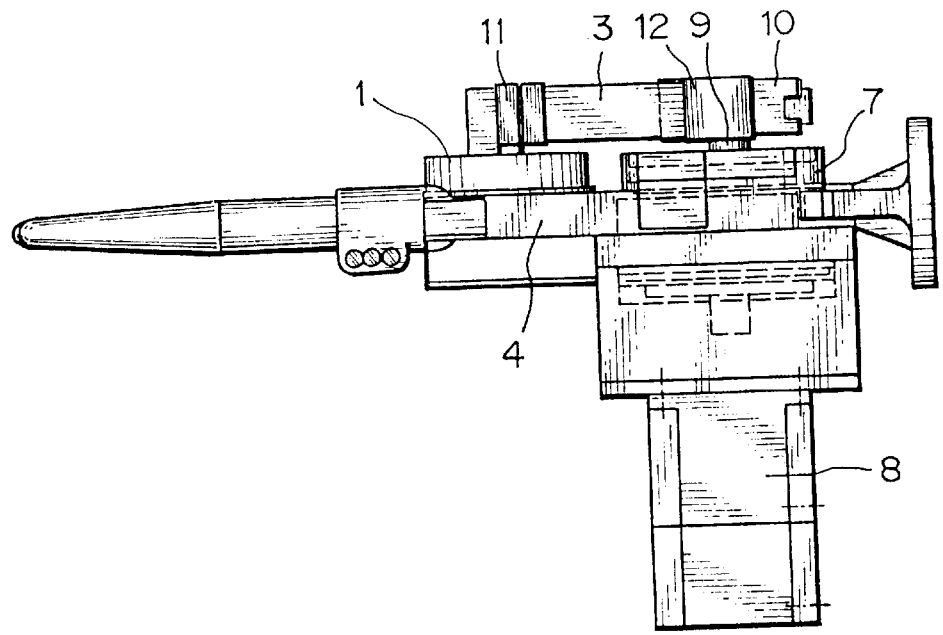
FIG. 2 is a plan view in FIG. 1.

In FIG. 1 and 2, a movable gun arm 1 has an upper electrode 2 at its tip end and a link 3 at its middle upper portion. A fixed gun arm 4 also has a lower electrode 5 at its tip end which opposes the upper electrode 2 of the movable gun arm 1. The middle portion of the fixed gun arm 4 and the rear end lower portion of the movable gun arm 1 are pivoted on a pivotal shaft 6, wherein the movable gun arm 1 is movable relative to the fixed gun arm 4. A motor 8 provided with a flat reduction gear 7 at its one side is fixed, for example, to the rear portion of the fixed gun arm 4 which is separated or different from the shaft 6. A wrist of a robot, not shown, can be connected to the rear end of the fixed gun arm 4.

A part of the reduction gear 7 penetrates the fixed gun arm 4, and an output shaft 9 of the reduction gear 7 extends to the other side of the fixed gun arm 4 and a swing arm 10 formed of a plate is fixed to the output shaft 9. One end of the link 3 is pivotally mounted on the middle upper portion of the movable gun arm 1 by a shaft 11 and the other end of the link 3 is pivotally mounted on the tip end of the swing arm 10 by a shaft 12. A substantially parallelogram link is formed by the fixed gun arm 4 between the shafts 6 and 9, the swing arm 10, the link 3, and the movable gun arm 1 between the shaft 11 and the shaft 6 while the fixed gun arm 4 forms a fixed link. A transformer 13 for use in a welding machine is fixed to the lower portion of the reduction gear 7.

In the X type electric welding machine having the construction set forth above, the motor 8 is rotated normally and reversely alternately. If the motor 8 is rotated normally, namely, clockwise upon completion of welding while the upper and lower electrodes 2, 5 are brought into contact with a workpiece 14, a rotational speed is reduced by the reduction gear 7 to rotate the swing arm 10 clockwise so that the movable gun arm 1 is pulled by the link 3 to perform opening operation relative to the fixed gun arm 4. Then, the movable gun arm 1 and the fixed gun arm 4 are moved by a robot while the movable gun arm 1 is opened relative to the fixed gun arm 4, and it is guided to a next workpiece. Subsequently, the motor 8 is reversely rotated in a state where the lower electrode 5 is brought into contact with the workpiece 14. The reverse rotational speed is reduced by the reduction gear 7 to rotate the swing arm 10 counterclockwise so that the movable gun arm 1 is pushed by the link 3 to perform the pressing operation, namely, the movable gun arm 1 is returned to a state shown in FIG. 1 where the welding operation is performed.

As mentioned above, in the X type electric welding machine of the invention, immediately after the rotational speed of the motor 8 caused by the quick rotation thereof is reduced by the reduction gear 7, the rotational speed allows the movable gun arm 1 to perform the opening operation or pressing operation so that a moment value of inertia converted on the basis of the shaft of the motor 8 becomes small. As a result, the acceleration or deceleration time of the upper and lower electrodes 2 and 5 become short during the opening and closing between the upper and lower electrodes 2 and 5, thereby efficiently shortening the welding speed, namely, the speed of welding by the upper and lower electrodes 2 and 5 relative to the workpiece 14. Since the movable gun arm 1 is allowed to perform the opening operation or pressing operation by way of the swing arm 10 and the link 3 after the torque is amplified or increased by the reduction gear 7, there scarcely occurs dispersion in the electrode pressing force given to the upper electrode 2 to achieve the desired welding. Further, since the reduction gear 7 having a relatively large diameter is disposed separately from the connection part 6 between the movable gun arm 1 and the lower electrode 5, namely, the shaft 6 on which the gun arms 1, 4 are pivoted, for example, at the rear portion of the shaft 6, the X type electric welding machine can be used for welding a large workpiece without reducing the effective lengths of gun arms for holding a workpiece according to the conventional X type electric welding machine.

Since the swing arm 10 and the link 3 are constituents of the parallelogram link while the fixed gun arm 4 forms the fixed link, a force outputted from the shaft of the motor 8 serving as the output outputted from the output shaft 9 of the reduction gear 7 and an electrode pressing force by the electrode transmitted to the upper electrode 2 from the tip end of the swing arm 10 by way of the link 3 have a substantially linear proportional relation so that even if an electrode pressing force is set by simple control mechanism or means having such a linear proportional relation, an electrode pressing force becomes an accurate one. Further, since the displacing angle of the movable gun arm 1 and that of the swing arm 10 are the same, the amendment of the positions of the electrodes owing to the wear of the electrodes and the opening angle of the movable gun arm 1 relative to the lower electrode 5 can be easily controlled.

Second Embodiment (FIG. 3):

An X type electric welding machine according to a second embodiment is now described with reference to FIG. 3.

Components which are the same as those of the first embodiment are denoted by the same reference numerals and the explanation thereof may be omitted.

A roller 21 fixed to a rear upper portion of the movable gun arm 1 is movable along the inner periphery of a groove 22 formed on the tip end of a swing arm 10.

A fixed bracket 23 is fixed to a pivotal shaft 6 on which a fixed gun arm 4 is pivoted at its rear end. The fixed bracket 23 is connected to a wrist of robot (not shown). A transformer 13 for use in a welding machine is fixed to the fixed bracket 23 and a reduction gear 7 connected to an output shaft of a motor is held by the transformer 13.

Figure 3:
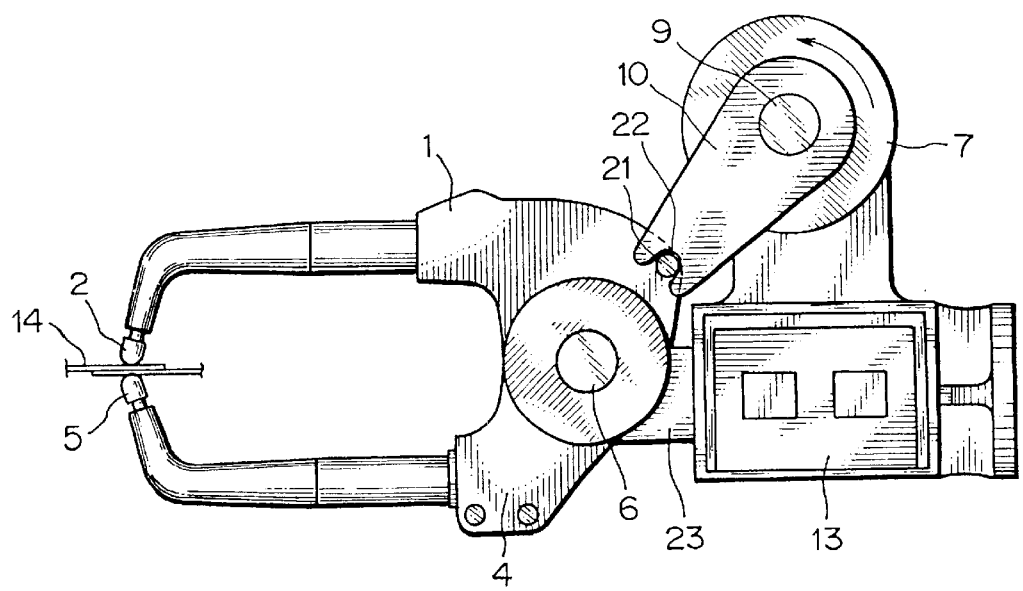
FIG. 3 is a side view of an X type electric welding machine according to a second embodiment of the invention.

In the X type electric welding machine having the construction set forth above, when the motor 8 is rotated counterclockwise upon completion of the welding operation in a state where upper and lower electrodes 2, 5 are brought into contact with and pressed against a workpiece 14 as shown in FIG. 3, so that the rotational speed is reduced by the reduction gear 7, thereby rotating the swing arm 10 counterclockwise so that the movable gun arm 1 is pulled by the swing arm 10 through the roller 21 and perform the opening operation. The gun arms 1, 4 are moved by a robot while the movable gun arm 1 is opened relative to the fixed gun arm 4 and they are guided to a next workpiece 14, where the motor 8 is reversely rotated in a state where the lower electrode 5 is brought into contact with the workpiece 14. The rotational speed of the motor 8 is reduced by the reduction gear 7 to rotate the swing arm 10 clockwise so that the movable gun arm 1 is pressed by the swing arm 10 by way of the roller 21 to perform the pressing operation, then it is returned to a state shown in FIG. 3 where it performs the welding operation. Since the roller 21 can move along the inner periphery of the groove 22 formed in the swing arm 10 during the opening operation or pressing operation by the movable gun arm 1, an excessive force is not applied to the swing arm 10.

In the second embodiment, since the roller 21 provided on the movable gun arm 1 is disposed to be movable inside the groove 22 provided on the tip end of the swing arm 10, while the output shaft 9 of the reduction gear 7, the roller 21 and the shaft 6 during the pressing operation are substantially aligned on the same straight line, the output outputted from the shaft of the motor 8 serving as the output outputted from the output shaft 9 of the reduction gear 7 to which the swing arm 10 is fixed and an electrode pressing force applied to the upper electrode 2 from the tip end of the swing arm 10 by way of the roller 21 have substantially a linear proportional relation, the electrode pressing force is not susceptible to the wear of the electrodes 2, 5, the variation of deflection of the gun arms 1, 4, and the wear of each bearing. Further, since the displacing angle of the movable gun arm 1 and that of the swing arm 10 have a linear proportional relation, the correction of the positions of the electrodes owing to the wear of the electrodes and the control of the opening angle of the movable gun arm 1 relative to the fixed gun arm 4 are very easily performed.

Figure 4:
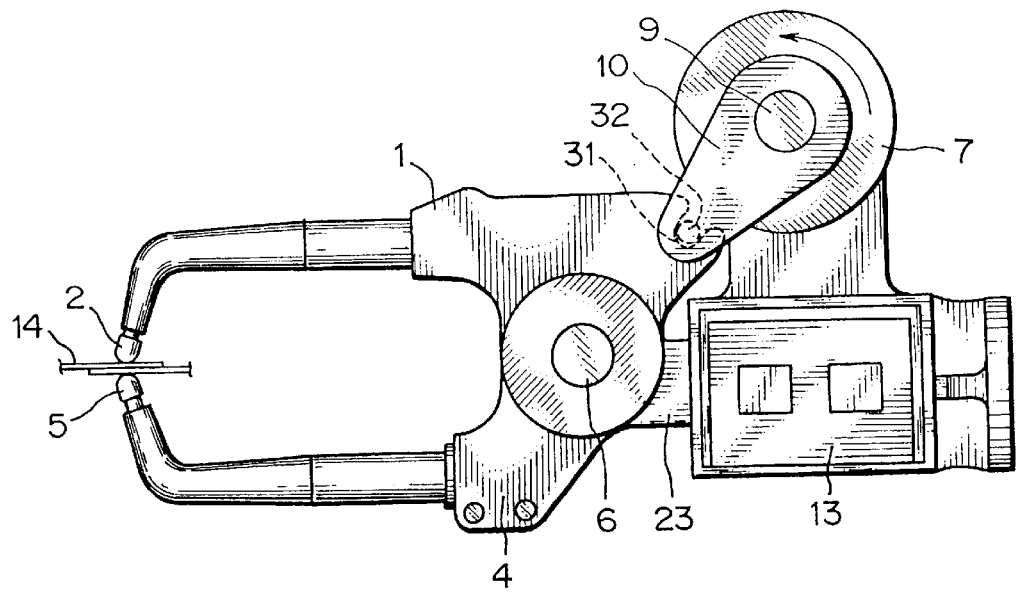
FIG. 4 is a side view of an X type electric welding machine according to a third embodiment of the invention.

Third Embodiment (FIG. 4):

An X type electric welding machine according to a third embodiment of the invention is now described with reference to FIG. 4.

Components which are the same as those of the first and second embodiments are denoted by the same reference numerals and the explanation thereof may be omitted.

A groove 31 is formed on the rear upper portion of a movable gun arm 1, and a roller 32 is fixed to the tip end of a swing arm 10. The roller 32 is movable along the inner periphery of the groove 31.

Even in the X type electric welding machine having the construction set forth above, the opening operation or pressing operation by the movable gun arm 1 can be performed by the roller 32 provided on the swing arm 10 owing to the alternative normal and reverse rotation of a motor 8. Accordingly, the X type electric welding machine of the third embodiment can perform substantially the same operation and effect as those of the second embodiment.

Figure 5:
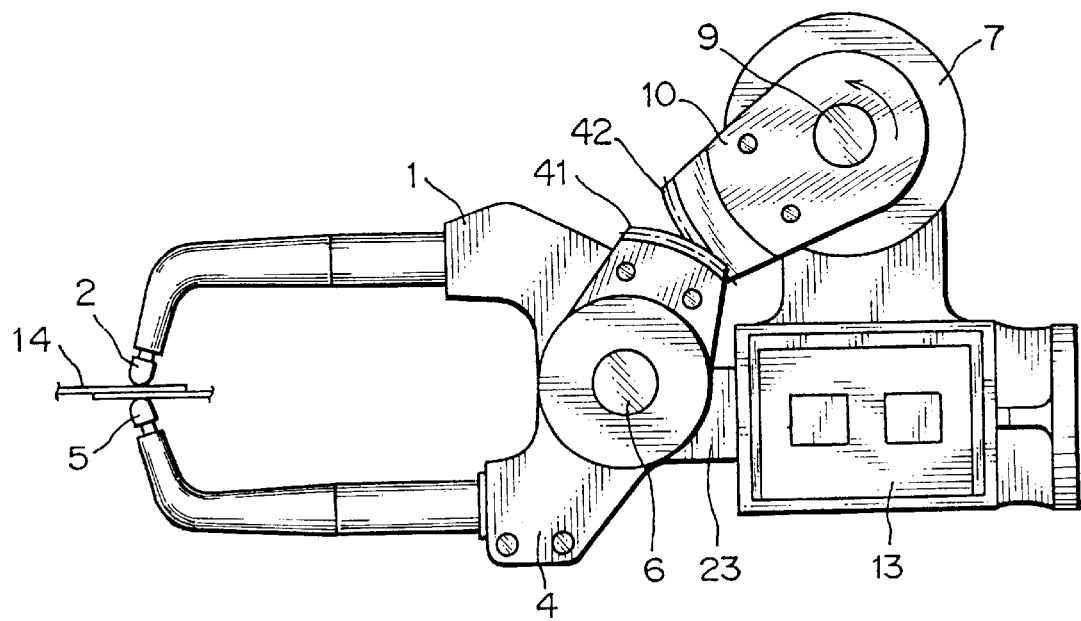
FIG. 5 is a side view of an X type electric welding machine according to a fourth embodiment of the invention.

Fourth Embodiment (FIG. 5):

An X type electric welding machine according to a fourth embodiment of the invention is now described with reference to FIG. 5.

Components which are the same as those of the first to third embodiments are denoted by the same reference numerals and the explanation thereofmay be omitted.

A gear 41 is fixed to the rear portion of a movable gun arm 1 and a gear 42 is formed on the tip end of a swing arm 10 (a gear fixed to an output shaft 9 of a reduction gear 7), wherein both the gears 41 and 42 mesh with each other.

Even in the X type electric welding machine having the construction set forth above, the opening operation or pressing operation by the movable gun arm 1 can be performed by the gear 42 fixed to the output shaft 9 of the reduction gear 7 owing to the alternative normal and reverse rotation of a motor 8. Further, the portion where both the gears gear 41 and 42 mesh with each other is positioned substantially on the straight line connecting between the output shaft 9 and the shaft 6, so that the X type electric welding machine of the fourth embodiment can perform substantially the same operation and effect as those of the second embodiment.

Figure 6:
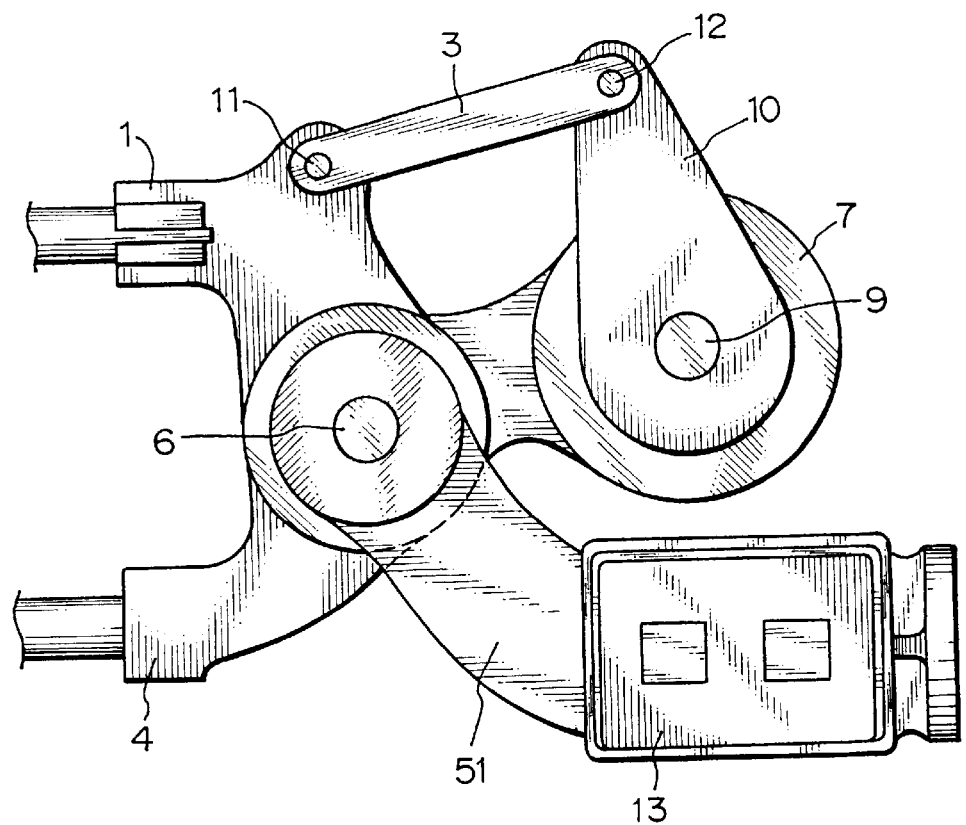
FIG. 6 is a side view of an X type electric welding machine according to a fifth embodiment of the invention.

Fifth Embodiment (FIG. 6):

An X type electric welding machine according to a fifth embodiment of the invention is now described with reference to FIG. 6.

Components which are the same as those of the first to fourth embodiments are denoted by the same reference numerals and the explanation thereof may be omitted.

In the fifth embodiment, a movable gun arm 1 and a fixed gun arm 4 are disposed respectively to be rotatable about a shaft 6, and the shaft 6 is fixed to a bracket 51 which is fixed to a wrist of a robot (not shown). A transformer 13 for use in a welding machine is fixed to the bracket 51. A motor 8 provided with a flat reduction gear 7 fixed to the rear portion of the fixed gun arm 4 is not fixed to the bracket 51 but moves when the fixed gun arm 4 moves.

Even in the X type electric welding machine having the construction set forth above, the opening operation or pressing operation by a movable gun arm 1 can be performed by a link 3 provided on a swing arm 10 owing to the alternative normal and reverse rotation of a motor 8, like the first embodiment shown in FIG. 1. Since a power transmission mechanism of the fifth embodiment is substantially the same as that of the first embodiment shown in FIG. 1, the operation and function thereof is substantially the same as those of the first embodiment in FIG. 1.

Further, in the fifth embodiment, since the fixed gun arm 4 is rotatably fixed to the shaft 6 fixed to the bracket 51, a gun body including the motor 8 and the reduction gear 7 is swung relative to the bracket 51 to perform an equalizing operation.

In the X type electric welding machine according to the invention, since the reduction gear is disposed at the portion separately from the connection part of the gun arms and the motor is connected to the reduction gear while the movable gun arm is rotated by the power transmission mechanism provided on the output side of the reduction gear, the movable gun arm can perform the opening operation or pressing operation after a quick rotational speed of the motor is reduced by the reduction gear, so that moment of inertia converted on the basis of the shaft of the motor becomes small. As a result, the acceleration and deceleration time of the electrodes becomes short during the opening or closing of the electrodes of the welding machine. Further, since the reduction gear having a relatively large diameter is disposed at the portion separately or different from the connecting part of the gun arms so that the effective lengths of gun arms for holding a workpiece according to the conventional X type electric welding machine is not reduced, and hence the X type electric welding machine of the invention can be applied to a large workpiece. Still further, the output outputted from the shaft of the motor and the electrode pressing force transmitted to the movable gun arm have a substantially liner proportional relation so that an accurate electrode pressing force can be obtained for an electrode pressing force set by a simple controlling means. More still further, the electrode pressing force is not susceptible to the wear of the electrodes, variation of deflection of the gun arms or the wear of each bearing. Further, the displacing angle of the gun arms and the number of revolutions of the motor are proportional, the positions can be easily controlled.

What is claimed is:

1. An electric welding machine comprising:

at least two gun arms each having electrodes at tip ends thereof which oppose each other, the gun arms being connected to each other at a connection part on which at least one of the gun arms is rotatably pivoted;

a reduction gear disposed separately from the connection part of the gun arms, and a motor connected to the reduction gear;

a power transmission mechanism provided at an output side of the reduction gear for rotating one of the gun arms, wherein said power transmission mechanism comprises a swing arm fixed to an output shaft of the reduction gear and a link formed between the swing arm and one of the gun arms;

wherein the swing arm and the link are connected to each other so that an output from a shaft of the motor and an electrode pressing force transmitted to one of the electrodes from a tip end of the swing arm by way of the link have a substantially linear proportional relation.

2. The electric welding machine of claim 1, wherein the electric welding machine comprises an X type electric welding machine.

3. An electric welding machine comprising:

at least two gun arms each having electrodes at tip ends thereof which oppose each other, the gun arms being connected to each other at a connection part on which at least one of the gun arms is rotatably pivoted;

a reduction gear disposed separately from the connection part of the gun arms, and a motor connected to the reduction gear;

a power transmission mechanism provided at an output side of the reduction gear for rotating one of the gun arms, wherein said power transmission mechanism comprises a swing arm fixed to an output shaft of the reduction gear, a groove formed in a tip end of the swing arm and a roller provided on one of the gun arms and movable along the groove;

wherein the roller provided on one of the gun arms is disposed to be movable in the groove so that an output from a shaft of the motor and an electrode pressing force transmitted to one of the electrodes from the tip end of the swing arm by way of the roller have a substantially linear proportional relation.

4. The electric welding machine of claim 3, wherein the electric welding machine comprises an X type electric welding machine.

5. An electric welding machine comprising:

at least two gun arms each having electrodes at tip ends thereof which oppose each other, the gun arms being connected to each other at a connection part on which at least one of the gun arms is rotatably pivoted;

a reduction gear disposed separately from the connection part of the gun arms, and a motor connected to the reduction gear;

a power transmission mechanism provided at an output side of the reduction gear for rotating one of the gun arms, wherein said power transmission mechanism comprises a swing arm fixed to an output shaft of the reduction gear, a roller disposed in a groove formed in one of the gun arms and provided at a tip end of the swing arm;

wherein the roller is movable in the groove so that an output from a shaft of the motor and an electrode pressing force transmitted to one of the electrodes by way of the groove from the tip end of the swing arm have a substantially linear proportional relation.

6. The electric welding machine of claim 5, wherein the electric welding machine comprises an X type electric welding machine.

7. An electric welding machine comprising:

at least two gun arms each having electrodes at tip ends thereof which oppose each other, the gun arms being connected to each other at a connection part on which at least one of the gun arms is rotatably pivoted;

a reduction gear disposed separately from the connection part of the gun arms, and a motor connected to the reduction gear;

a power transmission mechanism provided at an output side of the reduction gear for rotating one of the gun arms, wherein said power transmission mechanism comprises a transmission gear fixed to an output shaft of the reduction gear and a gun arm gear provided on one of the gun arms;

wherein the transmission gear fixed to the output shaft of the reduction gear and the gun arm gear mesh with each other so that an output from a shaft of the motor is transmitted to one of the electrodes through the transmission gear fixed to the output shaft of the reduction gear by way of the gun arm gear to provide an electrode pressing force.

8. The electric welding machine of claim 7, wherein the electric welding machine comprises an X type electric welding machine.

* * * * *